United States Patent [19]
Burns et al.

[11] 3,910,703
[45] Oct. 7, 1975

[54] MEASURING APPARATUS USING THE MOIRE FRINGE CONCEPT OF MEASUREMENT

[75] Inventors: Richard H. Burns, Webster; Donald R. Hosack; Helmut Welker, both of Jamestown, all of N.Y.

[73] Assignee: Bausch & Lomb Incorporated, Rochester, N.Y.

[22] Filed: May 28, 1974

[21] Appl. No.: 473,461

Related U.S. Application Data

[62] Division of Ser. No. 295,777, Oct. 6, 1972, Pat. No. 3,833,303.

[52] U.S. Cl. ................................. 356/169; 356/172
[51] Int. Cl.² .......................................... G01B 11/02
[58] Field of Search ............................ 356/169, 172

[56] References Cited
UNITED STATES PATENTS

| | | | |
|---|---|---|---|
| 3,362,772 | 2/1971 | Erbe | 356/169 |
| 3,579,836 | 5/1971 | Kraus | 356/169 UX |

*Primary Examiner*—Ronald J. Stern
*Assistant Examiner*—Richard A. Rosenberger
*Attorney, Agent, or Firm*—Frank C. Parker; DeWitt M. Morgan

[57] ABSTRACT

Measuring apparatus using the moire fringe concept of measurement to provide a precise digital numeric indication of displacement between two relatively movable members. The apparatus includes an accurately ruled grating or scale, a transducer head in the form of an index grating supported on a movable carriage and a transducer support housing. The scale is secured in a spar which is preferably mounted to the carriage of a machine tool such as a milling machine. The transducer support housing is mounted to the stationery part or bed of the machine tool and is provided with a cantilever spring element which holds the carriage in direct contact with the scale. In order to facilitate mounting of the measuring apparatus, a temporary alignment bracket is secured to both the spar and the transducer support housing.

10 Claims, 6 Drawing Figures

MEASURING APPARATUS USING THE MOIRE FRINGE CONCEPT OF MEASUREMENT

CROSS-REFERENCE TO RELATED APPLICATION

This application is a division of application Ser. No. 295,777, filed October 6, 1972, now U.S. Pat. No. 3,833,303 of Richard H. Burns, Donald R. Hosack and Helmut Welker, for MEASURING APPARATUS USING THE MOIRE FRINGE CONCEPT OF MEASUREMENT.

BACKGROUND OF THE INVENTION a. Field of the Invention:

This invention relates to incremental photoelectric measuring apparatus using the moire fringe concept of measurement. This principle is used in such devices as optical comparators, height gages and measuring machines. It also finds application in machine tools.

b. Description of the Prior Art:

The main element of a moire fringe type measurement system is an accurately ruled grating or scale of the desired length of travel. This scale is commonly of glass or steel and has a precisely known number of lines per unit length (for example, 500 equal lines and spaces per inch). When a second scale with the same line structure is superimposed on the scale at a slight angle such that the two line structures cross a pattern of dark and light bands is produced as the lines on the second scale fall on lines or spaces of the first scale. This integrated image is what is known as a moire fringe pattern. The spacing of the moire fringes can be adjusted by rotating one scale relative to the other about an axis which is perpendicular to both scales. When the second scale, commonly known as the index grating, is translated along the scale normal to the direction of the lines on the scale the fringe pattern travels at right angles to the direction of movement. By passing a light beam through both the scale and the index grating the movement of the fringe pattern may be converted into electrical signals by the use of photoelectric sensors. The output from such photo-electric sensors can be, for example, summed, shaped and amplified and then fed to an electronic digital display counter. The signals from the photo-electric sensors may also be used to give an indication of the direction of motion.

As a general proposition, systems incorporating the moire fringe concept of measurement are not subject to wear errors or the degree of backlash inherent in translating the motion of, for instance, a rack and pinion to a direct measurement. Thus, they can be used on machine tools whenever a linear or angular change in position must be accurately determined. Such use eliminates the need for highly accurate lead screws, racks and pinions or other similar devices.

Measuring apparatus based on the moire fringe concept comprises three basic parts: (1) an accurately ruled scale; (2) a reading or transducer head which is movable relative to the scale; and (3) an electronic display unit for translating the electronic signals received from the transducer head into a legible numeric display. In many systems the transducer head includes an index grating, a light source and photo-electric sensors.

In order for the transducer head to pick up an optical image off the scale the spacing and alignment between the scale and the index grating has to stay very constant. In the past, this has required a lengthy and critical mounting procedure whereby the scale had to be lined up parallel to the direction of, for example, machine table travel and then the transducer head had to be separately mounted at a specified distance from and rotational alignment to the scale. Typically, the parallelism between the longitudinal axes of the transducer head and the scale had to be maintained within a few thousandths of an inch along the entire length of travel. If the system had to be dismounted for servicing such lengthy alignment procedure had to be repeated upon reinstallation.

As an alternative to the above described separate parallel mounting of the scale and the transducer head both the scale and the transducer head may be mounted to the same spar. In this type of system the scale is fixed to the spar and the transducer head (containing the grating scale) mounted on a slide. The slide may take the form of a pair of machined surfaces on the spar. However, in order to insure that the spacing between the scale and the spar remains constant over the entire length of travel the slide must be carefully machined and the scale carefully mounted parallel to it.

In the past, two methods were used to mount the spar which supports the scale to the machine or fixture on which the scale was to be used. One method consisted of mounting the spar at each end only. However, for spar lengths of 4 feet or longer, vibrations could easily be set up which could jeopardize the correct functioning of the system. Therefore, on longer lengths cumbersome support brackets were required to keep the vibrations to a minimum and also to prevent excessive deflection. Another method of mounting the scale supporting spar consisted of providing mounting holes at certain increments over the length of the spar. These mountings holes increased the height of the spar which, on certain machines, made mounting very difficult.

This invention overcomes the above described alignment problems by sliding the transducer head directly on the scale. Constant spacing and alignment between the two gratings is thereby assured. This invention also overcomes prior art mounting problems by providing the spar with a longitudinally extending female dovetail which is received on a male dovetail fastened to the mounting surface.

BRIEF SUMMARY OF THE INVENTION

Apparatus, securable to first and second relatively movable members, for use in measuring the relative displacement therebetween. The apparatus includes a scale, a scale support and transducer comprising a carriage which supports an index grating and has scale engaging means. The apparatus also includes a transducer support housing and means, secured between the transducer support housing and the carriage, for urging the scale engaging means into engagement with the scale. Finally, the apparatus includes a mechanism for rigidly coupling the transducer support housing to the scale support to correctly position the transducer support housing relative to the scale support until the scale support is secured to the first relatively movable member and the transducer support is secured to the second of the two relatively movable members.

In operation, the measuring apparatus is secured to the first and second relatively movable members by: (a) attaching the scale support to first member; (b) attaching the transducer support housing to the second member and (c) disengaging the coupling mechanism from both the scale support and the transducer support housing.

BRIEF DESCRIPTION OF THE DRAWINGS

FIG. 3 is another sectional view of the apparatus taken along line 3—3 of FIG. 1;

DESCRIPTION OF THE PREFERRED EMBODIMENT

Figure 1:
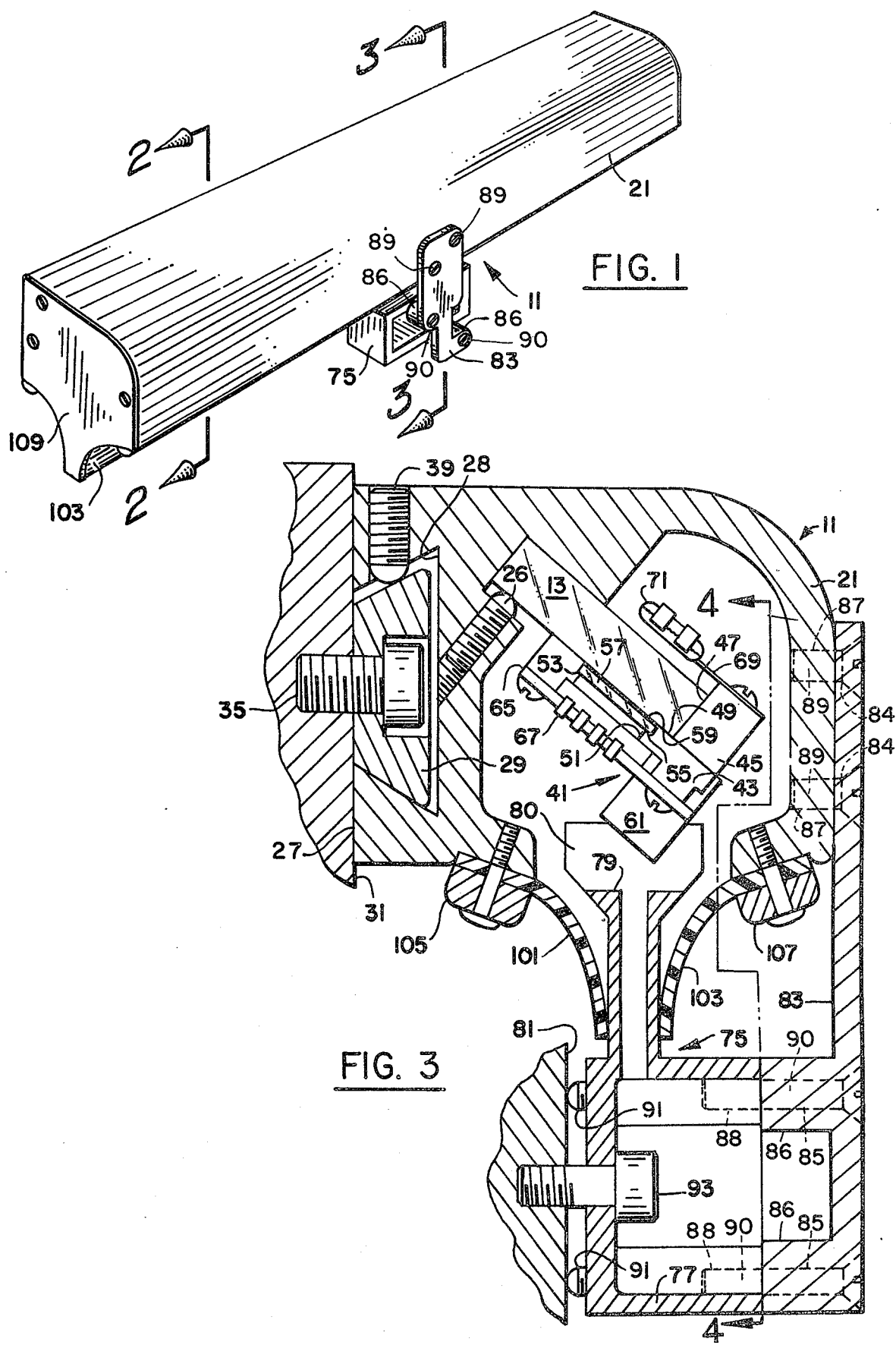
FIG. 1 is a perspective view of a preferred embodiment of the apparatus.

One of the basic components of apparatus 11 is an accurately ruled scale 13. In the preferred embodiment scale 13 is made of silvering quality plate glass having edges which are, for example, straight to within ±0.003 inches over the entire length. As is evident from inspection of, particularly, FIG. 2 scale 13 includes a bottom surface 15 and a bottom edge 17. Bottom surface 15 is provided with a line frequency of, for example, 500 equal lines and spaces per inch. These lines run perpendicular to the major axis of the scale. The bottom edge 17 is ground and polished over the entire length. Edge 17 is, preferably, perpendicular to surface 15.

Scale 13 is housed in spar 21 which has an inverted U-shape cross-section. The interior of spar 21 is provided with a longitudinally extending slot 23 which is inclined between 35° and 55° with respect to the vertical. Scale 13 is held in slot 23 either by a plurality of fasteners, such as set screws 25, 26, or by an epoxy cement.

Spar 21 is also provided with a longitudinally extending mounting surface 27 and a female dovetail 28 which extends parallel to slot 23. Mounting surface 27 and dovetail 28 may be either on the side, as illustrated in FIGS. 2 and 3, or may be located on the top surface of spar 21.

Figure 2:
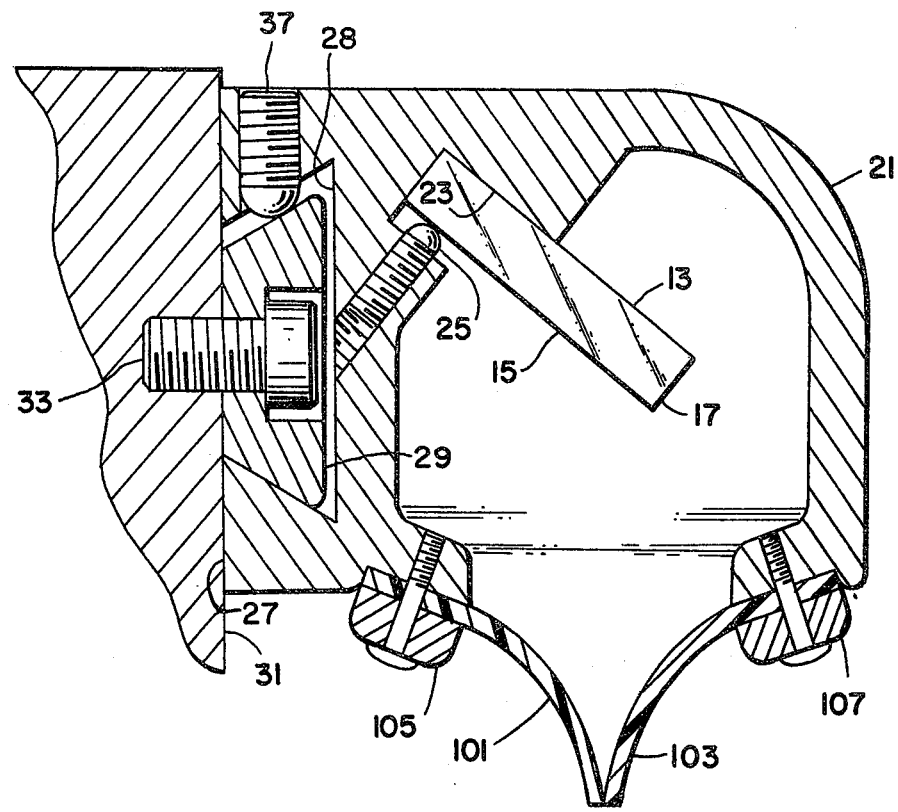
FIG. 2 is a sectional view of the apparatus taken along line 2—2 of FIG. 1.
Figure 6:
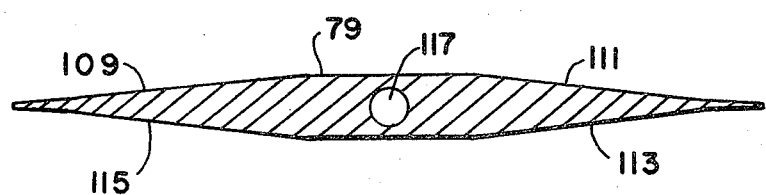
FIG. 6 is a sectional view of the transducer support housing taken along line 6—6 of FIG. 4.

As illustrated in FIGS. 2 and 3, a male dovetail 29 is provided to fasten spar 21 to machine mounting surface 31. Dovetail 29 is first secured to mounting surface 31 by fasteners, such as screws 33 and 35. Female dovetail 28 is then slid over male dovetail 29 and bolted down with a plurality of set screws, such as set screws 37 and 39. These screws tend to draw surface 27 tightly against mounting surface 31. If spar 21 has to be dismounted at a later time for servicing, male dovetail part 29 remains on mounting surface 31 thereby permitting expeditious remounting of spar 21.

Transducer head 41 consists of a main carriage body 43 and a carriage top 45. Both of these elements are made of low friction plastic material and are secured to each other by fasteners (not shown) such that scale engaging surfaces 47 and 49 are angled to each other at the same angle that surface 15 is angled with respect to edge 17. Since in the preferred embodiment surface 15 is perpendicular to edge 17, scale engaging surfaces 47 and 49 will also be perpendicular to each other.

Main carriage body 43 is provided with a rectangular opening 51 having a pair of opposed supporting surfaces 53 and 55. Received within opening 51 and in abutting relationship with supporting surfaces 53 and 55 is index grating 57. Index grating 57 is also made of silvering quality plate glass and has on surface 59 the same line frequency as scale 13. Since surfaces 53 and 55 are parallel to scale engaging surface 49 index grating surface 59 is also parallel to surface 49. As is evident from inspection of FIG. 3 surface 59 is spaced from surface 49.

Main carriage body 43 is also provided with a post 61 and a board 65 of insulating material which supports four photo-electric sensors 67. As is evident from inspection of FIG. 5 post 61 has a slotted recess 63.

Figure 4:
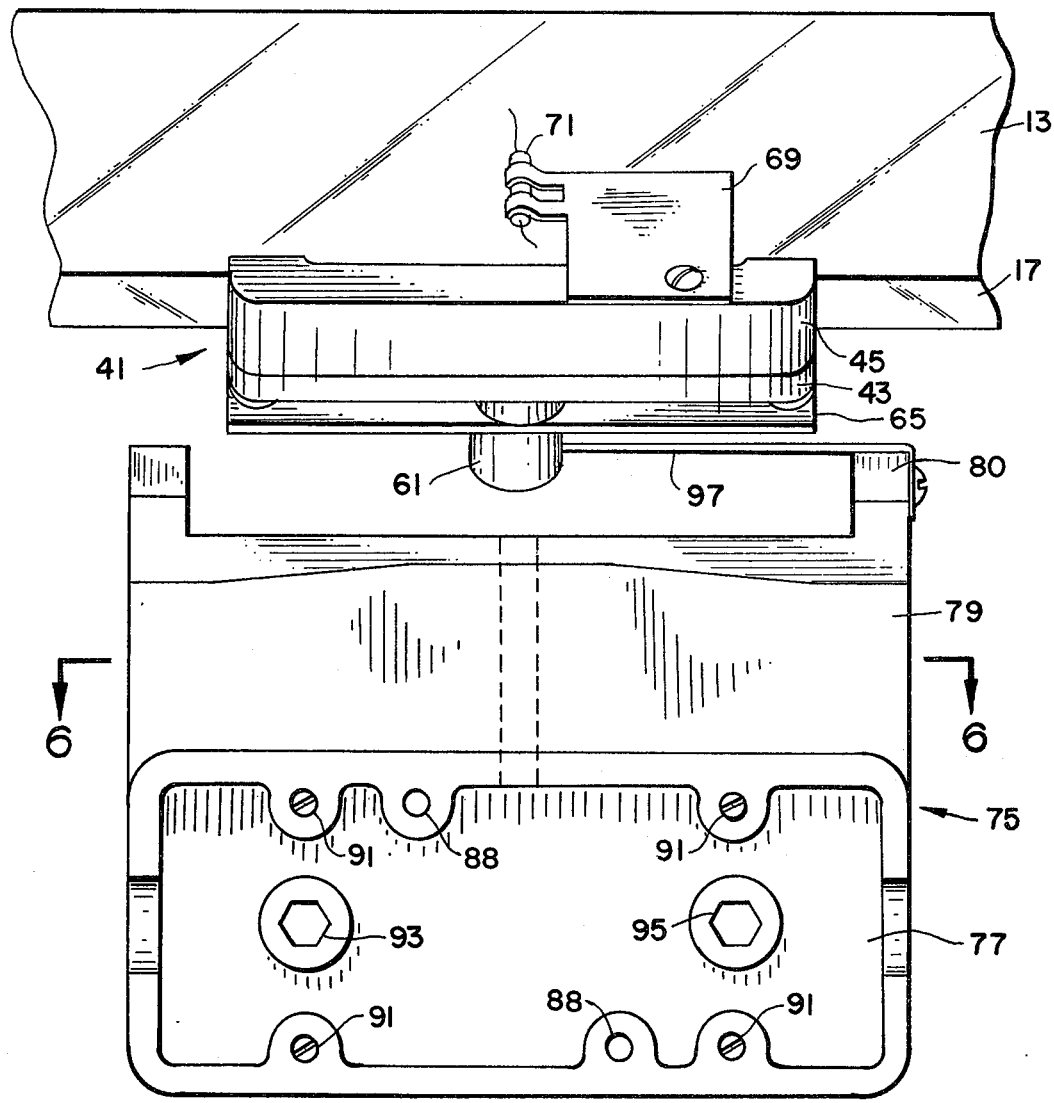
FIG. 4 is a sectional view taken along line 4—4 of FIG. 3 with the spar and seal removed for purposes of clarity.

Carriage top 45 supports lamp holder 69 which, in turn, supports lamp 71 in the manner illustrated in FIGS. 3 and 4.

Transducer support housing 75 includes a base portion 77 and upstanding protrusion portion 79. Housing 75 is secured to a second machine mounting surface 81 which is movable relative to machine mounting surface 31. In order to facilitate the mounting of housing 75 a temporary alignment bracket 83 is provided. As illustrated in FIG. 3, bracket 83 includes a first set of countersunk openings 84 and a second set of countersunk openings 85 which extend through bosses 86. To cooperate with openings 84 and 85 spar 21 includes a first pair of threaded openings 87 while base portion 77 of transducer support housing 75 includes a second pair of openings 88. Flat head machine screws 89 and 90 received within, respectfully, openings 84 and 85 and corresponding threaded openings 87 and 88 secure bracket 83 to both spar 21 and base portion 77. This arrangement correctly positions housing 75 relative to spar 21 and, hence, scale 13. Jack screws 91 in base portion 77 provide for correct spacing between base portion 77 and surface 81 and for mounting against irregular surfaces such as a cast machine surface. After screws 91 are brought into engagement with surface 81 base portion 77 is secured to surface 81 via bolts 93 and 95. Bracket 83 is then removed. However, if it becomes necessary to dismount housing 75 alignment bracket 83 can conveniently be used for remounting.

Figure 5:
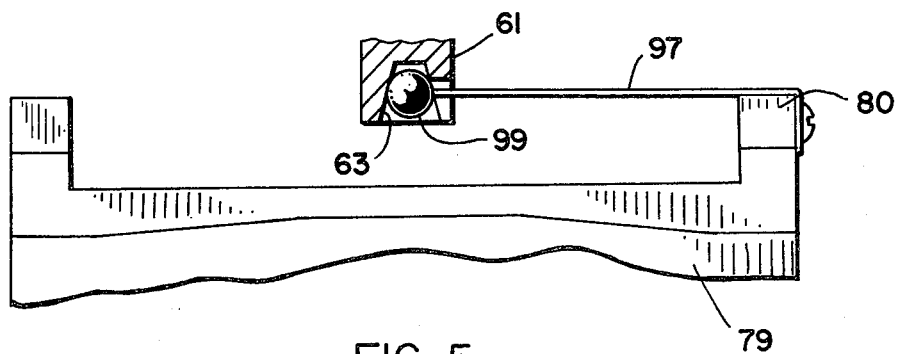
FIG. 5 is a detail of the connection between the transducer head and the transducer support housing.

As is also evident from inspection of FIG. 3 when housing 75 is properly mounted relative to both spar 21 and machine mounting surface 81 upstanding protrusion portion 79 extends into the interior of spar 21. To connect housing 75 to transducer head 41 a cantilever wire spring 97 is provided. As is best seen in FIGS. 4 and 5 cantilever spring 97 is secured at one of its ends to the enlarged upper end 80 of protrusion portion 79. The opposite end of cantilever spring 97 carries a ball 99 which is received in recess 63 provided in main carriage body 43. When spring 97 is assembled to end 80 and connected to main carriage body 43 transducer head 41 is connected to housing 75 by means of a ball and socket joint at the end of cantilever spring 97. The fact that scale 13 is inclined with respect to the vertical enables the upward force of cantilever spring 97 to hold scale engaging surfaces 47 and 49 in engagement with surface 15 and edge 17 in the manner illustrated in FIG. 3. This connection arrangement permits the necessary degree of freedom for transducer 41 so that it can remain in intimate contact with scale 13 even though the vertical position of housing 75 with respect to scale 13 may vary. At the same time, it virtually eliminates movement between housing 75 and transducer 41 along the length being travelled which would result in an erroneous reading of the actual relative distance travelled between machine mounting surfaces 31 and 81. With a spring pressure of approximately 5 ounces, backlash is in the order of .0001 inches.

In order to prevent dirt, machine chips or coolant fluids from contaminating scale 13 or transducer 41, spar 21 is provided with a pair of lip seals 101 and 103 secured by means of a pair of seal retainers 105 and 107. These seals, together with enlarged upper end 80 tend to prevent transducer support housing 75 from being easily withdrawn from spar 21. The opposite ends of spar 21 are closed by plates, one being illustrated in FIG. 1 at 109.

In order to minimize the opening in seals 101 and 103 created by housing 75, the center section of protruding portion 79 is provided with tapered surfaces 109, 111, 113 and 115 to give it the approximate cross section of a canoe.

Protruding portion 79 is also provided with a through hole 117 which receives fine wires (not shown) from photo-electric sensors 67 and lamp 71. Thus base 77 may serve as a splice box to connect these wires with the relatively heavier cable which is connected to an electronic digital display counter (not shown). A cover (not shown) is bolted onto base 77 upon removal of temporary alignment bracket 83 to enclose the wire connections.

In operation, with lamp 71 energized any movement of the moire fringe pattern created by the integrated image effects of the line structures on both scale 13 and index grating 57 is sensed by photo-electric sensors 67 and converted into electrical signals. The change in intensity of the light on photo-electric sensors indicates the passage of each fringe and hence measures the relative travel of index grating 57 with respect to scale 13. The output from the cells may be amplified, shaped and summed by appropriate circuitry (not shown) provided on either insulating board 65 or in the electric digital display unit itself or both. Such circuitry forms no part of the present invention and those skilled in the art would appreciate that it could take several different forms. Since index grating 57 is secured relative to main carriage body 43 of transducer head 41 and since scale engaging surfaces 47 and 49 are continuously maintained in contact with surface 15 and edge 17 by means of cantilever spring 97 the distance and alignment between index grating 57 and scale 13 is maintained constant thereby assuring that transucer head 41 will always pick up an optical image off scale 13.

Whereas the drawings and accompanying description have shown and described a preferred embodiment of the present invention it should be apparent to those skilled in the art that various changes may be made in the form of the invention without effecting the scope thereof.

What we claim is:

1. In apparatus, securable to first and second relatively movable members for use in measuring the relative displacement therebetween, including a scale, means for supporting said scale, a transducer means including a carriage and an index grating, said carriage including scale engaging means, transducer support means, and means secured between said transducer means and said carriage for urging said scale engaging means into engagement with said scale, wherein the improvement comprises: means for rigidly coupling said transducer support means to said scale supporting means to position said transducer support means relative to said scale supporting means until said scale supporting means is secured to said first member and said transducer support means is secured to said second member.

2. The combination as set forth in claim 1 wherein said transducer support means includes a base portion and an upstanding portion, said means for urging being secured to said upstanding portion, said base portion being securable to said second member.

3. The apparatus as set forth in claim 2 wherein said base portion includes surface engaging means, said surface engaging means being adjustable relative to said base portion and engageable with said second member to thereby insure correct spacing and alignment between said base portion and said second member.

4. The apparatus as set forth in claim 3 wherein said surface engagement means comprise jack screws.

5. The apparatus as set forth in claim 3 wherein said base portion includes a cavity and said upstanding portion has a through aperture opening into said cavity, said aperture serving as a conduit for wires from said transducer means, said cavity serving as a splice box.

6. The apparatus as set forth in claim 1 wherein said coupling means includes flat head machine screws and wherein one of said coupling means and said transducer support means includes tapered openings which cooperate with the heads of said flat head machine screws to correctly position said transducer support housing relative to said scale.

7. The apparatus as set forth in claim 6 wherein said coupling means includes bosses.

8. A method of attaching displacement measuring apparatus to first and second relatively movable members, said apparatus including a scale, means for holding said scale, transducer means, support means securable to said second member and means, secured between said support means and said transducer means, for maintaining said transducer means in engagement with said scale, said apparatus also including means to position said support means relative to said scale holding means until said apparatus has been attached to said first and second members, said method comprising:
   a. attaching said scale holding means to said first member;
   b. attaching said support means to said second member; and
   c. disengaging said positioning means from said scale holding means and said support means.

9. A method of attaching displacement measuring apparatus to first and second relatively movable members with the aid of alignment means, said apparatus including a scale, means for holding said scale, transducer means, transducer support means, and biasing means secured between said transducer support means and said transducer means for maintaining said transducer means in engagement with said scale, said method comprising:
   a. coupling said scale holding means to said transducer support means with said alignment means;
   b. attaching said scale holding means to said first member;
   c. attaching said transducer support means to said second member; and
   d. disengaging said alignment means from said scale holding means and said transducer support means.

10. A method of attaching displacement measuring apparatus to first and second relatively movable members with the aid of alignment means, said apparatus including a scale, means for holding said scale, transducer means, transducer support means, and biasing means secured between said transducer support means and said transducer means for maintaining said transducer means in engagement with said scale, said transducer support means including adjustable surface engagement means, said method comprising:

a. coupling said scale holding means to said transducer support means with said alignment means;

b. attaching said scale holding means to said first member;

c. moving said adjustable surface engagement means into engagement with said second member;

d. attaching said transducer support means to said second member; and e. disengaging said alignment means from said scale holding means and said transducer support means.

* * * * *

UNITED STATES PATENT OFFICE
CERTIFICATE OF CORRECTION

PATENT NO. : 3,910,703
DATED : October 7, 1975
INVENTOR(S) : Richard H. Burns, Donald R. Hosack & Helmut Welker It is certified that error appears in the above-identified patent and that said Letters Patent are hereby corrected as shown below:

Column 5, lines 63-64, change "transducer means" to --transducer support means--.

Signed and Sealed this

Twentieth Day of July 1976

[SEAL]

Attest:

RUTH C. MASON
*Attesting Officer*

C. MARSHALL DANN
*Commissioner of Patents and Trademarks*